June 5, 1934.  L. IGNACE  1,961,971
PROCESS FOR PREPARING AND APPLYING EMULSIONIZED MATERIALS
Filed July 30, 1928   2 Sheets-Sheet 1

Inventor
Lionel Ignace
By Addison A. Armstrong
Attorney

Inventor
Lionel Ignace
By Addison A. Armstrong
Attorney

Patented June 5, 1934

1,961,971

UNITED STATES PATENT OFFICE 1,961,971

PROCESS FOR PREPARING AND APPLYING EMULSIONIZED MATERIALS

Lionel Ignace, Paris, France, assignor to Societe Provia, Zug, near Zurich, Switzerland, a corporation of Switzerland Application July 30, 1928, Serial No. 296,399
In France July 25, 1927

11 Claims. (Cl. 94—23)

My invention relates to a process for the simultaneous preparation and application of emulsionized materials.

As is well known in the art, application of emulsionized materials on surfaces in general, and more specifically on the surface of roads, is usually brought about by preparing the emulsion in advance by a process appropriate to the circumstances, the said emulsion being subsequently applied to the surface upon which it is destined to be spread. Such a way of proceeding instigates several disadvantages among which may be cited the necessity of producing a stable emulsion capable not only of remaining at rest without dissociating but also capable of withstanding carriage with impunity for comparatively long periods of time. Likewise it frequently happens that the emulsion contains a relatively expensive product and a very cheap product. In such a case it has been necessary, during transportation, not only to pay carrying charges for the expensive product, but also for the cheap product, in which the first mentioned product was emulsionized, from whence there resulted considerable carrying charges which were out of proportion with the average value of the product. This is particularly the case for emulsions of hydrocarbonaceous materials such as tar, bitumen and asphalt, serving as a road covering which contain nearly as much water as the useful product. All of this water must be shipped in the emulsion at great expense even though, in fact, it is to be found nearly always in the immediate proximity to the place where it is to be used.

The objects of my invention reside in a process for overcoming these disadvantages which consists in effecting projection of the emulsion, material in suspension or other substance to be dispersed of an analogous nature by the same apparatus which serves for its preparation. My process may be carried into practice by means of apparatus known to the art or by the apparatus hereinafter described, destined to effect simultaneous operations of preparing and projecting the material in question in the form of a pulverized material emulsionized held in suspension or other analogous dispersing state.

Other objects of the invention will be obvious to those skilled in the art to which the invention relates in the following description taken in connection with the accompanying drawings illustrating, by way of example, several embodiments of an apparatus for carrying my process into practice.

In the drawings—

The apparatus illustrated in Figs. 1 to 4 utilizes, as will be seen, first a jet of gas or vapor for pulverizing, emulsionizing and projecting; and second a stabilizing saponifier introduced either into the steam or the material or in any other suitable manner for forming and limiting the state of dispersion to a predetermined time if necessary.

As the pulverizing and emulsionizing take place in the immediate vicinity of the point at which the material is applied and is projected at high speed, the said material does not have time to become dissociated, in such wise that most of the time the special saponifying stabilizing agents may be dispensed with.

On the other hand in the case where the emulsionizing of the pulverized material takes place in water, as is the case for hydrocarbonaceous materials destined to treat roads, only the material will have to be shipped and water may be employed in the form and proportions desired which may be found in the proximity of the place where it is to be used. By way of example, tar may be pulverized in a manner known to the art by a powerful jet of steam, the tar becoming emulsionized with said steam in a way which gives an unstable emulsion. If the jet of steam is of high velocity and if the apparatus is placed very close to the ground, it is frequently unnecessary to add a stabilizing saponifier to the steam because the emulsionized pulverulent material does not have time to break up during the fraction of a second which said material takes to reach the road.

In certain cases it may be found necessary to add a stabilizing saponifier to the steam, for example, by introducing it through suction into the jet of steam or by injecting it into the steam pipe. The latter method of proceeding is preferably brought about by my apparatus illustrated in Fig. 4 hereinafter described in detail.

Figure 3:
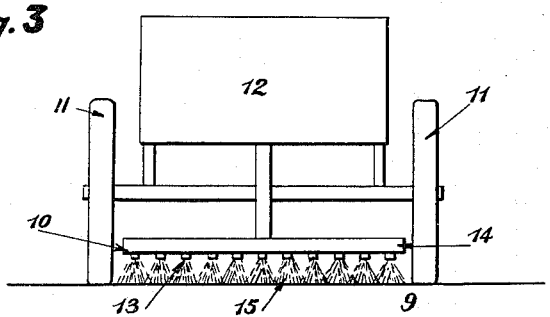
Fig. 3 is a conventional view illustrating how the apparatus of Figs. 1 and 2 is utilized for treating roads.

The apparatus destined to effect emulsionizing and projection by means of a steam jet is represented conventionally in Fig. 3. As therein shown, 9 indicates the surface of the road and 10 a pulverizing apparatus mounted on two wheels 11. Said apparatus is fed by a tank 12 and carries a number of blast pipes disposed preferably on a cross-bar 14 and through which is projected on to the road at a short distance therefrom and at high velocity by means of steam, jets 15 of the hydrocarbonaceous material in the form of an emulsionized pulverulent.

Figure 1:
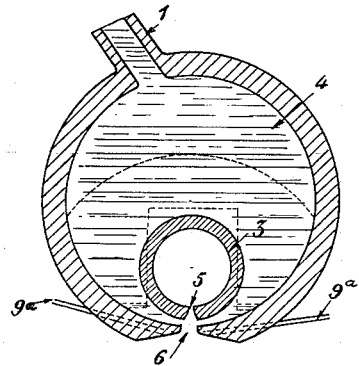
Fig. 1 represents a sectional view of an apparatus for pulverizing the material with a jet of gas or steam.
Figure 2:
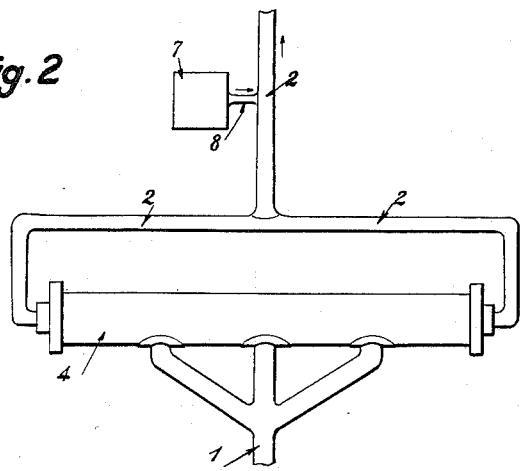
Fig. 2 is a view in side elevation corresponding to Fig. 1.

By displacing the apparatus along the entire road, there is obtained by very simple means, which on the whole is more efficient than the emulsion prepared in advance and applied cold since it possesses the advantages of both the emulsion and those issuing from the use of heat. For producing these jets of emulsion, obviously I may utilize various other devices without departing from the spirit of the invention as subsequently claimed. Figs. 1 and 2 illustrate by way of example one of these devices.

Referring to the said figures, 1 represents the tube through which the emulsionized material on the order of tar, bitumen or asphalt and 2 the pipes which carry steam under pressure produced by means of a suitable boiler. The steam arrives through a central pipe 3 disposed on the interior of a receptacle 4 where the tar or other material is placed. The steam leaves the pipe 3 through a longitudinal slot 5 disposed in spaced relation to a narrow longitudinal orifice in receptacle 4 for allowing the material to pass between the pipe 3 and the inner wall of receptacle 4. The steam coming into contact with the tar pulverizes it in a manner well known in the art and thus forms the emulsion sought.

For spreading the emulsion, instead of blast pipes or orifices 13 I may provide a continuous slot in the pipe 14 of Fig. 3 extending throughout the length thereof.

If it is found necessary to stabilize the emulsionized pulverulent, a stabilizing saponifier or dispersing agent is added which is placed in a receptacle 7 (Fig. 2) connected by means of a pipe 8 to the steam pipe. In this way the liquid contained in receptacle 7 is aspirated and carried along in the steam. In certain cases I may inject the saponifier into the steam pipe by means of an injector of the type such as is used in connection with boilers, the saponifier being then placed in a receptacle at atmospheric pressure.

Figure 4:
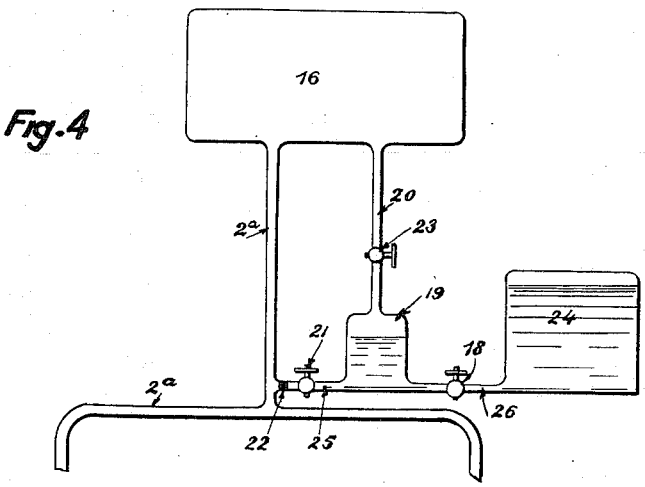
Fig. 4 is a modification of the apparatus of Figs. 1 and 2.

In Fig. 4 I have illustrated an embodiment in which injection of the saponifier into the steam is established under the best conditions and in well determined proportions.

The saponifier contained in a tank where the steam pressure of the boiler is exerted, is injected into the steam pipe due to the difference in static pressure existing between the tank and the conduit where the steam circulates. The saponifier is placed in a receptacle 19 whose upper part communicates preferably by means of a tube 20 with a boiler 16 and whose lower part is provided with a pipe 25 communicating with a steam exhaust pipe 2ª. In this way the steam from the boiler exerts on the surface of the saponifier a continuous pressure which injects the saponifier through the tube 25 into the steam pipe.

I likewise provide a device for bringing the saponifier into the receptacle under pressure from a second receptacle 24 at atmospheric pressure which is connected at its lower part to the lower part of receptacle 19 by means of a pipe 26. The pipes 20, 25 and 26 are provided respectively with cocks 23, 21 and 18.

When the cocks 23 and 21 are opened, the steam from boiler 16 exerts a continuous pressure on the surface of the saponifier placed in the receptacle 19 and the saponifier is injected in this way into the pipe 25 and thence into the conduit 2 where it is mixed with the steam whose pressure becomes reduced.

When it is desired to fill the receptacle 19 at predetermined intervals of time the cocks 23 and 21 are closed. The steam contained in the receptacle 19 condenses and creates a partial vacuum above the surface of the saponifier. If the cock 18 be opened at this moment, the said partial vacuum will exert an aspirating effect sufficient for refilling the receptacle 19 even if the level of the saponifier in the receptacle 24 is not higher than the level of the saponifier in receptacle 19.

For regulating the quantity of saponifier that it is desired to introduce into conduit 2, the valves 23 and 21 are manipulated in a suitable manner, valve 21 preferably being of the needle-valve type.

For assuring good diffusion of the saponifier in the steam, pipe 25 is provided with a calibrated spray nozzle 22.

If it is desired to give still more stability to the emulsion, whether it be that the cross-bar 14 of Fig. 3 must for some reason be separated from the surface 9 or that materials are being employed which break up very easily, lateral conduits 9ª (Fig. 1) may be employed for distributing a suitable dispersing agent which is mixed in the steam jet of the body to be emulsionized, on the order of tar, and emulsionizing steam, on the order of water vapor.

Figure 5:
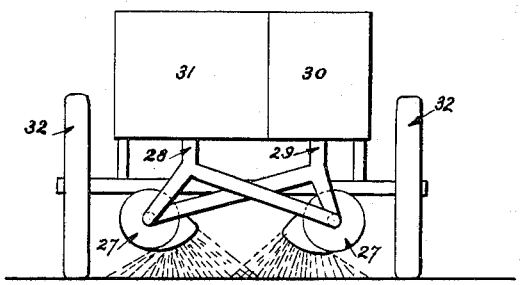
Fig. 5 illustrates another modified form of apparatus.
Figure 6:
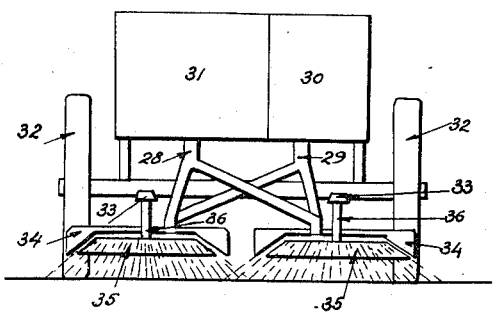
Fig. 6 illustrates still another modified form of apparatus.

In Figs. 5 and 6 I have illustrated conventionally an apparatus according to the invention utilizing two turbines of known type destined to disaggregate the bodies to be treated by causing them to pass between two surfaces very close together, preferably but not necessarily smooth, one of said surfaces being given with respect to the other a very rapid movement of rotation.

In the event that it is desired to assist the emulsion, suspended matter or analogous dispersing state by use of a saponifier, the said saponifier may be led for example, into the turbines through the same orifice as the body to be disaggregated.

Referring to Fig. 5 which shows an apparatus utilizing two horizontal turbines, 31 represents a tank adapted to be filled with hot bitumen and 30 a tank adapted to be filled with a saponifier, diluted if desired and likewise hot. Said two tanks are mounted in any suitable manner on wheels 32 by means of which the apparatus may be displaced over the surface to be covered. Two turbines 27, 27 are disposed beneath the tanks and on the one hand communicate therewith through piping 28, destined to lead the body to be emulsionized into the turbines and on the other hand through piping 29 destined to lead the saponifier into said turbines. The two turbines may be driven by any suitable means known in the art and may, for example be controlled by the wheels upon which the apparatus is mounted. It is to be understood that the manner of driving the turbines is unessential and might for example be brought about by means of an independent motor.

In Fig. 6 will be recognized the tank 31 for hot bitumen and the tank 30 for the hot diluted or undiluted saponifier. Said two tanks are mounted as in Fig. 5 on wheels 32. Beneath said tanks are disposed two vertical turbines 35 each consisting of a stator 34 and a rotor 36. A suitable controlling device 33 is provided on each turbine for regulating purposes. The hot bitumen penetrates the turbines through the pipes 28 and the saponifier through the pipes 29.

From the foregoing it will be obvious that in both Figs. 5 and 6, the body to be emulsionized, by penetrating between the active surfaces of each turbine, is disaggregated by coming into contact with the emulsionizing liquid with great rapidity.

It is to be understood that the invention is not limited to the examples illustrated and that there might be utilized, without departing from the invention as comprehended within the scope of the appended claims, other apparatus than that described destined to produce the emulsion and disposed in such wise that the emulsion suspended material or other dispersing expedient of an analogous nature is formed when the materials leave the apparatus, said apparatus being given a certain speed by which the said dispersing expedient is projected by the apparatus itself which serves for making it, immediately upon mixture of the materials, upon the surface of the road.

Having described my invention what I claim as new and desire to secure by Letters Patent is—

1. A method of treating road surfaces with emulsions which includes, providing an emulsifiable material, supplying thereto a fluid under pressure, and causing said fluid to emulsify said material and to atomize it onto the road surface.

2. A method of treating road surfaces with emulsions which includes, providing an emulsifiable material, supplying thereto a mixture under pressure, said mixture including a diluting fluid and a saponifying agent, and causing said mixture to emulsify said material and to atomize it onto the road surface.

3. A method of treating road surfaces with emulsions which comprises directing a spray of fluid onto the road and guiding into said spray a more slowly moving stream of unemulsified material.

4. A process for treating surfaces with emulsions which comprises pulverizing the material to be emulsionized by means of a jet of steam above the surface to be treated, adding a saponifying agent to said steam jet and utilizing said steam jet to project the stabilized emulsion thus formed on the surface to be treated whereby said emulsion is applied at the time of formation.

5. A process for treating surfaces with emulsions which comprises pulverizing the material to be emulsionized by means of a jet of steam above the surface to be treated, introducing a saponifying agent into said steam jet by utilizing the pressure of said steam and utilizing said steam jet to project the stabilized emulsion thus formed on the surface to be treated whereby said emulsion is applied at the time of formation.

6. A process for treating surfaces with emulsions which comprises pulverizing the material to be emulsionized by means of a jet of steam above the surface to be treated, introducing a saponifying agent into said steam jet by causing said steam to aspirate said agent and utilizing said steam jet to project the stabilized emulsion thus formed on the surface to be treated whereby said emulsion is applied at the time of formation.

7. A process of treating surfaces with emulsions which comprises forming and projecting said emulsion by means of steam, utilizing the pressure of said steam to introduce the material to be emulsionized into said steam, entrapping a portion of said steam at regular intervals, allowing said entrapped steam to condense and utilizing the vacuum thus formed to replenish the supply of material being introduced into said steam.

8. A method of treating road surfaces with emulsions, which comprises, subjecting the material to be emulsified, a diluting fluid, and a saponifying agent to a mechanical action for mixing said bodies into an emulsion, and allowing that emulsion to be projected onto the road surface, as it is being formed, by said mechanical action.

9. A method of treating road surfaces with emulsions, which comprises, subjecting the material to be emulsified, water, and a saponifying agent to a mechanical action for mixing said bodies into an emulsion, and allowing said emulsion to be projected onto the road surface, as it is being formed, by said mechanical action.

10. A method of treating road surfaces with emulsions, which comprises, subjecting the material to be emulsified, a diluting fluid, and a saponifying agent to centrifugal disintegration for thoroughly mixing said bodies, and allowing said emulsion to be projected onto the road surface, as it is being formed, by the centrifugal force.

11. A method of treating road surfaces with emulsions, which comprises, subjecting the material to be emulsified, water, and a saponifying agent to centrifugal disintegration so as to thoroughly mix said bodies, and allowing the emulsion thus formed to be projected onto the road surface, as it is being formed, by the centrifugal force that is being used for said disintegration.

LIONEL IGNACE.